United States Patent [19]

Meadows et al.

[11] Patent Number: 4,742,611
[45] Date of Patent: May 10, 1988

[54] BATTERY ASSEMBLY PROCESS AND APPARATUS

[75] Inventors: Clarence A. Meadows, Muncie; Phillip E. Grady, Daleville, both of Ind.; Lawrence B. Plant, Milford, Mich.

[73] Assignee: General Motors Corporation, Detroit, Mich.

[21] Appl. No.: 67,256

[22] Filed: Jun. 29, 1987

[51] Int. Cl.$^4$ ............................................. H01M 2/24
[52] U.S. Cl. ..................................... 29/623.1; 429/160; 164/514; 164/DIG. 1; 219/75; 219/121 R; 219/137 R; 228/58; 228/901; 403/270
[58] Field of Search ............... 429/160; 29/623.1, 730, 29/731; 219/137 R, 121 R, 75, 383; 228/901, 58; 164/508, 514, DIG. 1; 373/90; 403/270, 271, 272

[56] References Cited

U.S. PATENT DOCUMENTS

| | | | |
|---|---|---|---|
| 3,767,889 | 10/1973 | Sano et al. | 219/137 |
| 3,806,696 | 4/1974 | Young et al. | 219/137 |
| 3,988,169 | 10/1976 | McLean | 29/623.1 |
| 4,037,077 | 7/1977 | Harder | 219/75 X |
| 4,164,310 | 8/1979 | Di Giacomo et al. | 228/58 |
| 4,169,223 | 9/1979 | Alvarez | 29/623.1 X |
| 4,177,551 | 12/1979 | Johnson et al. | 29/623.1 |
| 4,485,959 | 12/1984 | Orlando et al. | 29/623.1 X |
| 4,683,180 | 7/1980 | Bish et al. | 429/160 X |

FOREIGN PATENT DOCUMENTS 1321279 6/1973 United Kingdom .

Primary Examiner—Anthony Skapars
Attorney, Agent, or Firm—Lawrence B. Plant

[57] ABSTRACT

Method and apparatus for joining lead battery parts (e.g., plate lugs, intercell connectors, terminals, etc.) together via a low resistance electrical coupling wherein substantially oxide-free, arc-melted, superheated molten lead is cast into a cavity between the parts. The parts are shielded from the arc while being bathed in a non-oxidizing atmosphere which is preferably formed from an ionizable, non-oxidizing gas heated by the lead-melting arc and spewed onto the parts along with the molten lead to provide additional heat thereto.

24 Claims, 5 Drawing Sheets

BATTERY ASSEMBLY PROCESS AND APPARATUS

This invention relates to the manufacture of lead-acid storage batteries and particularly to the joining of lead parts together therein by casting a lead connector therebetween.

BACKGROUND OF THE INVENTION

Lead-acid storage batteries comprise several galvanic cell elements each encased in separate compartments of a substantially leak-proof container containing sulfuric acid electrolyte. Each cell element typically comprises at least one plate-like, positive electrode (i.e., positive plate), one plate-like negative electrode (i.e., negative plate) and a porous separator (e.g., a thin microporous sheet and/or absorbent glass mat) therebetween. Multi-plate cell elements are commonplace and comprise a stack of alternating positive and negative polarity plates interleaved one with the other and the separators. The plates themselves each comprise a conductive substrate which supports an electrochemically active material thereon and conducts electrical current substantially uniformly therethrough. In Pb-acid batteries, the plates comprise a leady active material (i.e., $PbO_2$ for the positive plates and Pb for the negative plates) pasted onto a reticulated Pb-alloy (e.g., Pb-Ca-Sn or Pb-Sb) grid substrate. A lug projects from each grid and serves to electrically couple its associated plate to other electrical components of the battery. For example, aligned lugs of like polarity plates of a multi-plate cell element are commonly electrically coupled one to the other and to intercell connectors or terminals by a so-called plate strap which is typically burned to, or cast about, the plates' lugs. Heretofore, essentially three techniques have been proposed to make such plate straps. In the first technique, a pre-cast plate strap having a plurality of toes, interdigitated with the plate lugs, is burned to the plate lugs by means of a gas torch applied directly thereto. This technique has been used commercially for many years. In the second technique, upstanding plate lugs are enclosed in a mold and molten lead poured into the mold to form the plate strap. A third technique is a variation of the second wherein an open-topped mold is first filled with a predetermined amount of molten lead and thereafter the plate lugs of an inverted cell element are immersed therein. The solidified strap is subsequently removed from the mold, the cell element returned to its upright position and finally inserted into a battery container. Practice of both the second and third so-called "cast-on-strap" techniques were performed essentially in the open air with some attempts being made to flood at least the mold area with inert gas in an effort to exclude air therefrom and thereby reduce the formation of oxides.

The aforesaid second technique never achieved widespread, if any, commercial use presumably owing to the inability to reliably implement such a process on a production scale. In this regard, metal which was poured into the mold at a single site was expected to spread uniformly throughout the mold (i.e., in and around the upstanding plate lugs) and still bond well to the lugs. However, non-uniform distribution of the lead in the mold as well as non-uniform cooling of the melt usually occurred and resulted in poor quality, high resistance connections between the plate lugs and plate strap. The aforesaid third technique substantially eliminated the non-uniform flow, cooling and heat distribution problems of the second technique and has been used commercially for many years. However, it too has disadvantages. In this regard, commercial practice of this technique requires the use of a melting/holding furnace containing a large supply of molten lead ready for pouring, as well as an associated plumbing network of melt delivery pipes, valves, nozzles, etc. This complicated assemblage of melt handling equipment is cumbersome, requires considerable maintenance and has to be kept hot at all times even when plate straps are not being cast. The heat required to melt and keep large quantities of lead molten, as well as keep the melts' delivery plumbing hot, not only results in a costly consumption of energy but radiates into the work area making it a less desirable operator working environment. Moreover, the maximum practical temperature useful with such prior "cast-on-strap" techniques was effectively limited to about 850° F. above which untoward oxidation of the molten lead occurs which tends to cause equipment fouling and result in oxide inclusions in the casting. As a result, in actual practice, melt is typically cast from such machines at temperatures below about 830° F. Such a low lead temperature reduces the ability of the molten lead to effectively melt the solid lugs in the mold and thereby results in unnecessarily high electrical resistance between the lugs and the plate strap. For example, and as shown in FIG. 8 hereof, such processes resulted in melting only the tips of the lugs with the melt cast into the mold. The remainder of the lug is left substantially intact with only the surfaces thereof bonded to the solidified plate strap. Finally, experience has shown that the equipment commercially available for metering and delivering the lead into the molds by those techniques is not capable of consistently casting plate straps of the exact same size. Rather, the mass of the plate straps varies significantly one from another over the course of a production run. As a result, in order to insure that each and every plate strap has at least the minimum amount of lead necessary for current conduction and strength it is common practice to purposely set the delivery equipment to dispense more lead (often as much as 30% more) into the molds than is theoretically necessary. Hence many straps are cast with more lead than needed which results not only in heavier batteries but considerable excess cost.

Other lead battery parts are also welded together in a battery. For example, intercell connectors and connections made between plate straps and sidewall terminals have both been made both by gas torch and electrical resistance welding. Moreover, the GTAW process, often referred to as TIG welding, has been used to make intercell connections as disclosed in Johnson et al 4,177,551. However, Johnson et al's direct TIG welding technique is susceptible to oxidation of the molten metal while at the arc-melting temperature and can cause splattering of the lead which not only leaves an unsightly joint but increases the possibility of lead splatter falling into and contaminating the cell elements in the vicinity of the weld. Such direct TIG welding is not acceptable for forming plate straps to lugs. In this regard, trying to adapt such a process to the joining of a plurality of disconnected plate lugs would require either additional tooling or a solid bar of lead in the trough in order to provide an arc-sustaining counter-electrode therein. Finally, it has been found that in the absence of a bar of lead in the trough along with the lugs, directly applied TIG arcs: (1) completely destroy lead-calcium-tin alloy lugs; and (2) ignite low melting plastic trough materials such as, for example, are disclosed in copending Bish et al U.S. patent application Ser. No. 859,364 filed May 5, 1986, now U.S. Pat. No. 4,683,180 and assigned to the assignee of the present invention.

Accordingly, it is an object of the present invention to provide a unique, simple, energy-efficient process and apparatus for joining lead battery parts together via a low resistance, substantially oxide-free connection cast therebetween. It is another object of the present invention to provide a unique, simple, energy-efficient process and apparatus for casting a substantially oxide-free plate strap to a set of aligned, upstanding, lead-acid storage battery plate lugs wherein controlled amounts of substantially oxide-free, superheated, molten lead is cast about the lugs in such a manner as to cause the lugs to substantially completely amalgamate with the lead cast thereabout. It is a further object of the present invention to provide a unique, simple, energy-efficient process and apparatus for assembling a Pb-acid storage battery wherein substantially oxide-free, low resistance plate straps and an intermediate intercell connector are formed in a single casting operation within the battery container so as to amalgamate with battery plate lugs associated with the straps. These and other objects and advantages of the present invention will become more readily apparent from the description thereof which follows.

BRIEF DESCRIPTION OF THE INVENTION

The method of the present invention comprehends the indirect application of a gas tungsten arc to provide heated gas and substantially oxide-free, superheated lead melt for electrically joining lead battery parts (e.g., intercell connectors, terminals, plate lugs and straps, etc.). The method/apparatus of the present invention: (1) simply and conveniently provides molten lead on demand from a solid source thereof without any unnecessary energy consumption or generation of waste heat; and (2) is capable of concurrently providing streams of (a) substantially oxide-free lead at temperatures in excess of 950° F. and (b) non-oxidizing gases at temperatures of about 300° F.–400° F. The method/apparatus of the present invention is useful for: (1) forming intercell connections; (2) joining plate straps to terminals; and (3) particularly connecting a set of aligned, upstanding, like-polarity, lead-acid storage battery plate lugs to each other in a cell element or, optionally, to connect such cell element to an adjacent cell element in a single operation via an intercell connector concurrently formed in an opening in the top of an intercell partition separating adjacent cell compartments of a battery container. Lug connections so formed have a significantly lower electrical resistance than heretofore obtainable by commercial cast-on-strap methods and result from a substantially complete amalgamation of the plate lugs with the melt cast thereabout.

In one specific application of the process/apparatus of the present invention, a trough (i.e., elongated mold) is positioned about a set of aligned lugs for receiving and shaping molten lead poured therein. The term "lead" as used herein is intended to include not only pure lead but also lead alloys typically found in Pb-acid batteries e.g., Sb, Sn, As, Al, Ca, etc. An appropriate flux (e.g., azelaic acid, phosphoric acid, zinc chloride, etc.) may be applied to the lugs either before or after they are assembled in the trough. A convenient and preferred application of flux comprises sprinkling small grains of dissolved and dehydrated azelaic acid onto the lugs in the trough after assembly. The flux cleans the lugs and agitates the melt thereby promoting better melting of the lugs. The trough may be of the permanent or temporary type. A permanent trough remains with the cell element throughout its life such as disclosed in the aforesaid U.S. Ser. No. 859,364. A temporary trough is typically formed by separate tooling means positioned about the lugs only during pouring and solidification and subsequently removed. During casting the length of the trough is traversed from one end to the other with an arc-melting and molten lead dispensing device comprising: a substantially non-consumable electrode for generating an electric arc; means for supplying an ionizable, non-oxidizing gas (e.g., Ar, Ar+$H_2$, He, etc.) to the arc; means for shielding the lugs in the trough from the electric arc; means for feeding a continuous length (e.g., wire) of solid lead into the arc for melting therein; and means for directing a stream of superheated molten lead formed in the arc into the trough surrounding the lugs. The stream-directing means and the lug-shielding means will preferably comprise the selfsame structural element.

In operation, a substantially continuous length of lead wire is fed into the arc generated by the electrode at a rate commensurate with the rate at which the dispensing means traverses the trough so as to provide a substantially continuous stream of superheated, substantially oxide-free melt sufficient to cover the lugs in the trough by the time the dispensing means reaches the end thereof. The arc itself is generated in an ionizable, non-oxidizing gas which supports the arc while at the same time prevents oxidation of the ultra-hot molten lead formed therein. Similarly, the trough is blanketed with a substantially non-oxidizing gas so as to prevent oxidation of the cooler, but nonetheless vulnerable, melt therein. The non-oxidizing gas which blankets the trough may be supplied separately from the arc-supporting gas. Preferably, however, arc-supporting gas which has been heated by the arc is caused to exit the dispensing device so as to impinge directly onto the lugs so as not only to provide the non-oxidizing atmosphere for the trough but also to add significant additional heat to the lugs therein for facilitating the melting and amalgamation thereof with the arc-melted molten lead.

The arc-melting and dispensing device preferably includes a housing defining a melting chamber surrounding the arc which is pressurized by the ionizable, non-oxidizing gas so as to prevent the influx of air to the melting zone where the ultra-hot molten lead is most vulnerable to oxidation. The housing carries a nozzle which, (1) directs the stream of molten lead into the trough, while protecting it from oxidation as it moves from the arc into the trough; and (2) directs ionizable, non-oxidizing gas, which has been heated by the arc, directly down onto the lugs so as to add significant additional heat thereto to promote a more rapid amalgamation of the lugs with the arc-melted lead stream. The heated gases exiting the nozzle will preferably be of sufficient quantity to substantially blanket the trough therewith and thereby obviate the need for a secondary source of non-oxidizing gas to protect the melt in the trough.

Plate straps manufactured in accordance with the present invention have consistently resulted in the substantially complete amalgamation of the plate lugs with the arc-melted lead which in turn has resulted in strap-lug assemblies having electrical resistances which are about 15 times lower than similar assemblies made by the inverted lug cast-on-strap process described above. This significant reduction in resistance provides the opportunity to substantially reduce the lead content of the plate straps without sacrificing conductivity. Moreover, the process/apparatus of the present invention permits more precise control (i.e., within about 5%) of the amount of molten lead dispensed to the trough.

The process/apparatus of the present invention is particularly useful in forming plate straps on two adjacent cell elements as well as an intercell connector therebetween in a single traversing movement. In this regard, the troughs on each cell element are aligned on opposite sides of an opening formed in the top of an intercell partition separating the cell elements and together form a substantially continuous trough for receiving the superheated arc-melted lead. When assembling a battery in this fashion, the region of the partition contiguous the intercell connector fusing region of the partition opening is preferably thickened so as to form a saddle or shelf, or the like, which serves as a heat sink to mitigate the deleterious effects of molten lead on the partition material surrounding the opening.

The process/apparatus of the present invention is useful to form battery intercell connectors and/or side terminal connections as well. In this regard, connectors may be made by positioning two parts together and directing an arc-melted stream of molten metal, such as discussed above, through an aperture in one of the parts and onto the other part. For example, an intercell connector may be made by pressing two upstanding plate strap ears on opposite sides of an aperture in an intercell partition. One of the ears has an opening therein substantially aligned with the aperture. After preheating the ears, arc-melted lead is dispensed into opening and aperture until they are filled. Similarly, a plate strap ear may be joined to a terminal in the side wall of a battery container by providing an opening in the ear, abutting the ear to the terminal and dispensing arc-melted lead into the opening in essentially the same fashion as done when forming the intercell connector but without the intermediate apertured partition. In each case the ears will preferably be preheated by arc-heated gases from the lead dispenser prior to dispensing the lead.

SPECIFIC EMBODIMENTS OF THE INVENTION

The invention will better be understood when considered in the light of the detailed description of certain specific embodiments thereof which is given hereafter in conjunction with the several Figures in which.

Figure 1:
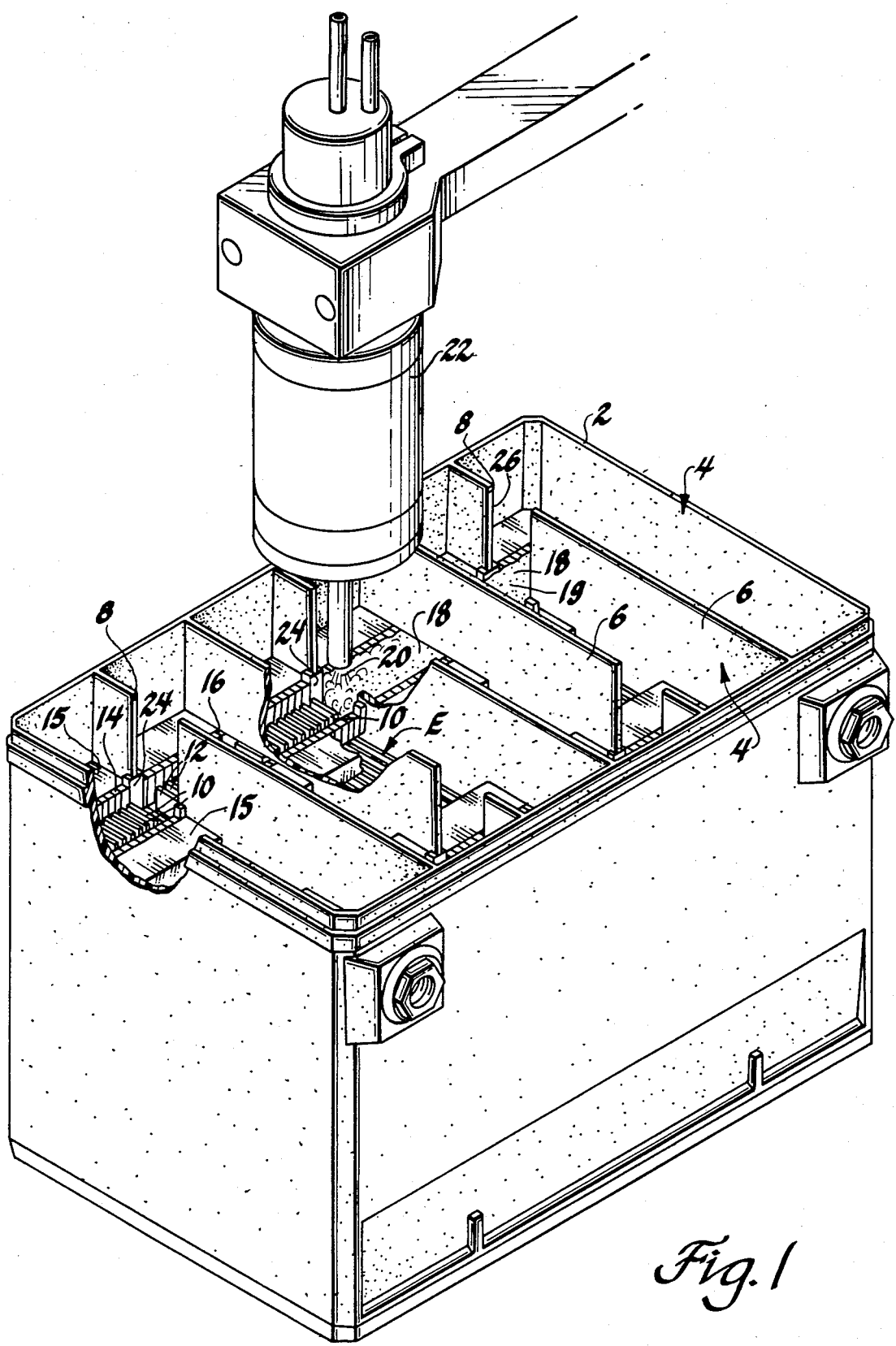
FIG. 1 is a perspective view of an uncovered battery container illustrating a method of assembling a battery in accordance with one aspect of the present invention.

FIG. 1 depicts a battery container 2 having a plurality of cell compartments 4 each including a cell element E comprising a plurality of positive and negative polarity plates alternately interleaved one with the other and with appropriate interplate separators as is well known in the art. The several compartments 4 are separated one from the other by intercell partitions 6 which include notch-like openings 8 in the upper edges thereof for receiving intercell connectors formed in situ therein. Each positive polarity plate in one cell element includes an upstanding lug 10 and each negative plate in the cell element in the next adjacent compartment includes and upstanding lug 12. The positive plate lugs 10 of one cell element are aligned with each other and with similarly aligned negative plate lugs 12 in the next cell element on opposite sides of the opening 8 in the partition 6. The positive polarity lugs 10 are surrounded by a trough 14 and the negative polarity lugs 12 are surrounded by trough 16. The troughs 14 and 16 will preferably be permanent (i.e., remain with the battery) and be formed by abutting collars on each of the lugs as described in copending U.S. patent application Ser. No. 859,364 filed May 5, 1986, in the names of Bish et al and assigned to the assignee of the present invention. Such temporary troughs 14 and 16 may be made from thermoplastics (e.g., polypropylene) having relatively low softening temperatures and, if so, will be temporarily (i.e., until initial solidification) flanked by blocks of metal 15 to support the sides of the troughs 14 and 16 against drooping under the heat from the melt. After solidification the blocks are removed. When higher temperature material, (e.g., polypropylene sulfide) plastic is used the blades 15 may be eliminated. Plate straps 18, as well as intercell connectors 19, are formed by dispensing a stream of arc-melted, molten lead 20 into the troughs 14 and 16 and opening 8 by traversing the length thereof with an arc-melting, molten lead dispenser 22. The opening 8 is preferably defined by a thickened portion of the surrounding partitions which forms a saddle 24 where contact with the melt is to occur. The thickened saddle 24 provides a larger mass of intercell partition plastic contacting the hot melt and hence serves as a heat sink, or thermal buffer, to mitigate the deleterious affects of the hot lead on the plastic defining the lower, melt-receiving portion of the opening 8. An upper portion 26 of the opening 8 above the intercell connector is eventually reconstituted by injection molding plastic therein after the intercell connectors have been made.

The lead dispenser 22, is carried by an arm 27 of a suitably programmed robot and traverses the length of the troughs 14 and 16 and opening 8 dispensing a steady stream of melt along the way. The dispenser 22 preferably follows a zig-zag pattern and, most preferably, the pattern traced by the dotted lines in FIG. 6 such that the lead stream impinges on substantially the centermost portions 28 of each of the lugs which lie inboard the ends 30 and 32 of each set of aligned lugs. Tests have shown that such a zig-zag pattern has consistently produced the most homogeneous amalgamation of Pb-Ca-Cn lugs with arc-melted Pb-Sb-Sn alloy cast into troughs 14 and 16.

Figure 2:
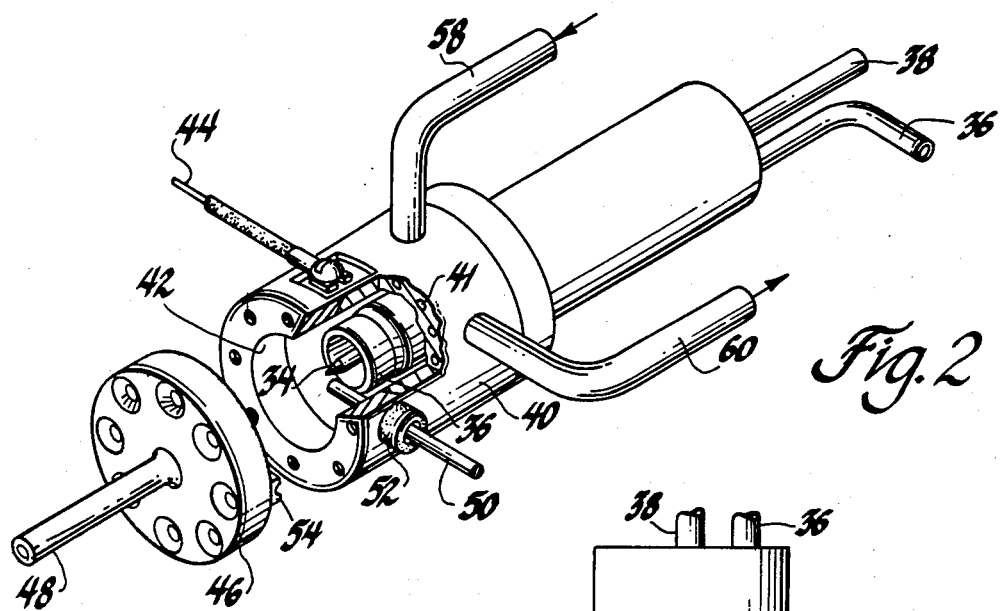
FIG. 2 is a partially broken away, exploded, perspective view of an arc-melting, molten lead dispensing device according to the present invention.
Figure 3:
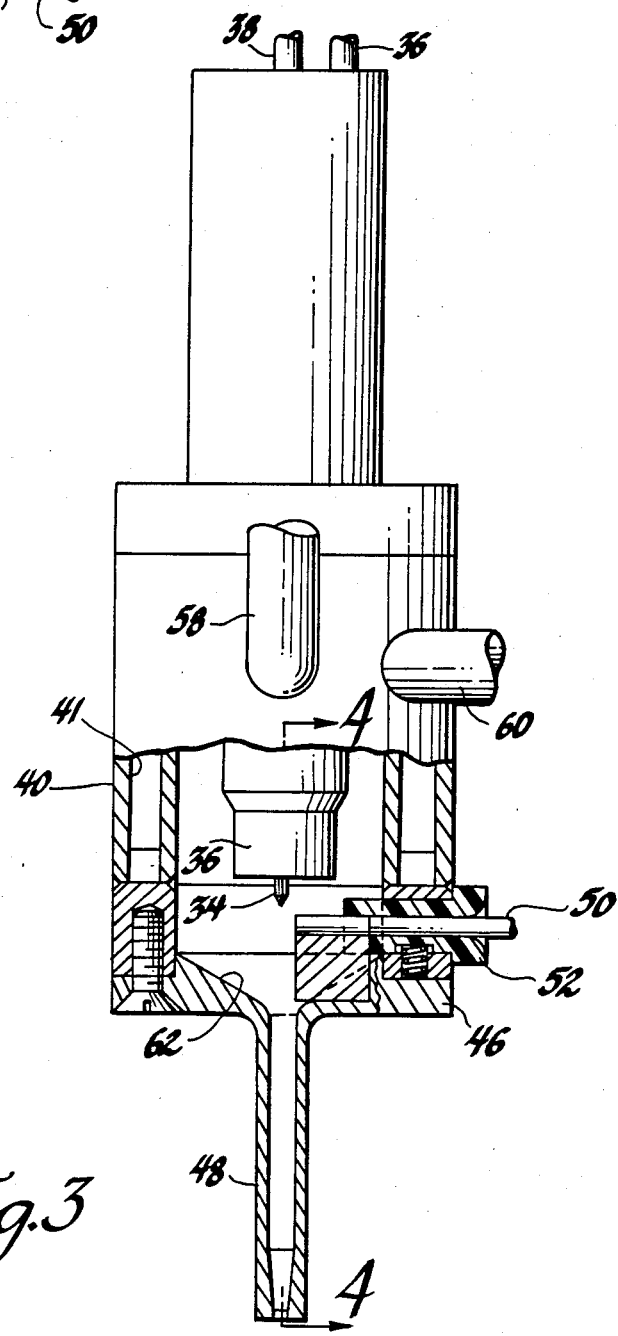
FIG. 3 is a broken away, elevational view of the arc-melting, lead dispensing device of FIG. 2.
Figure 4:
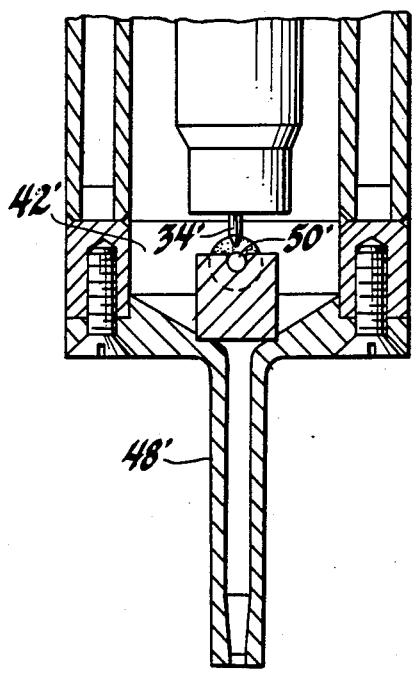
FIG. 4 is a view in the direction 4—4 of FIG. 3.

The arc-melting lead dispenser 22 itself, is best shown in FIGS. 2–4 and comprises a central non-consumable (e.g., tungsten) electrode 34 surrounded by a ceramic tube 36 through which an ionizable, substantially non-oxidizing gas (e.g., argon, argon+$H_2$ or helium) is pumped via a gas inlet tube 36 at a rate of about 4–10 CFH and a pressure of about 5–10 psi. The ionizable gas supports the electric arc as is well known in the TIG welding art, while its non-oxidizing character keeps the molten lead from oxidizing at the 1500° F. or so temperature it may reach in the arc. Electrical power is supplied to the arc-forming electrode 34 via power cable 38.

A metal housing 40 surrounds the electrode 34 and provides a melting chamber 42 which is filled and pressurized (i.e., for $O_2$ exclusion) with the arc-supporting gas from the tube 36 and serves to contain the heat, light, and lead splatter from the arc. One housing used successfully has an outside diameter of about $2\frac{3}{4}$ inches, an inside diameter of about 1 7/16 inches and has a continuous, serpentine cooling channel 41 winding therethrough. The metal housing 40 is electrically grounded via cable 44. A closure plate 46 screwed to the open end of the housing 40 includes a nozzle 48 for directing a stream of molten lead formed within the melting chamber 42 into the troughs 14 and 16 as best illustrated in FIG. 1. The closure plate 46 carries a copper-tungsten alloy e.g., E10W) block 54 which serves as an erosion-resistant counterelectrode for the center electrode 34 for generating the Pb-melting arc therebetween. The counterelectrode block 54 is electrically connected to the power source (not shown) via the ground connection 44.

A lead or lead alloy wire 50 is fed through an insulating (e.g., polyimide) bushing 52 substantially continuously into the arc generated by the electrode 34 in the melting chamber 42. A $\frac{1}{8}$ inch diameter wire comprising about 3% Sb, about 2% Sn and the balance Pb and fed at a rate of about 540 inches/min. has proven effective for casting plate straps to lead-calcium-tin plate lug alloys typically used in maintenance-free batteries. The mechanism (not shown) for feeding the wire 50 is appropriately electrically insulated from the melt dispenser 22 to insure that the lead wire 50 does not accidentally conduct the arc-forming power therethrough causing melting thereof and complete shutdown of the system.

The housing 40 is cooled by circulating oil (i.e., at about 200° F.–225° F.) from inlet 58 through the cooling passages 41 to outlet 60. A thermocouple (not shown) is used to measure the outside surface temperature of the housing 40. In practice, it is preferred not to initiate the Pb-melting arc until the temperature of the housing is at least about 200° F. to insure that lead does not solidify or chill too much when it contacts the nozzle 48. On the other hand, if surface temperature exceeds about 350° F. failure of the oil cooling system is indicated and the arc is terminated until repairs are made.

Figure 5:
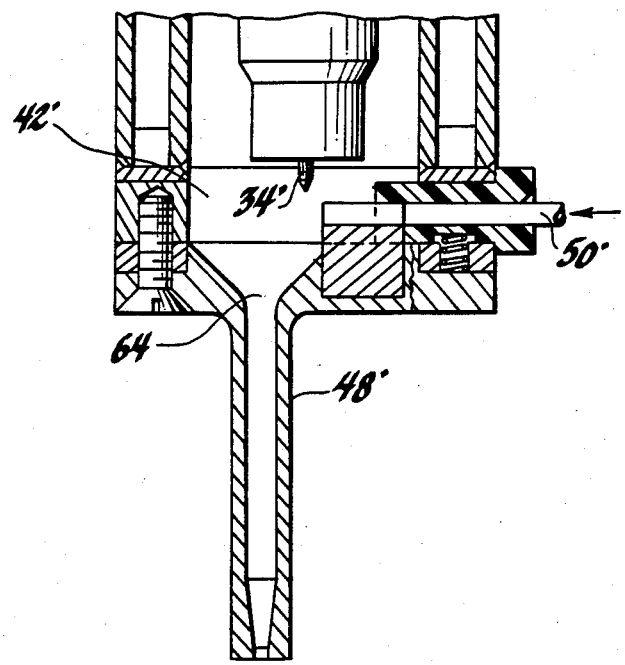
FIG. 5 is a sectional view, like that of FIG. 3, but of a different embodiment of an arc-melting, lead dispensing device according to the present invention.

FIG. 5 depicts a variation of the dispensing device shown in FIGS. 2–4 wherein the nozzle 48' is offset from the centerline of the electrode 34' in the direction that the wire 50' moves into the melting chamber 42'. In this regard, the wire 50' moves into the melting chamber 42' at a rate of about 500–600 inches per minute and accordingly tends to propel the molten lead formed in the arc in a forward direction. In the case of the embodiment shown in FIGS. 2–4, this forward propelling of the molten metal causes the molten lead to fall on the end plate 46, high up on the funnel-like inlet 62 to the nozzle 48, and then run back down into the nozzle 48. This has a chilling affect on the lead and can also cause a back up of lead in the inlet 62. In the embodiment shown in FIG. 5, however, the offset of the nozzle 48' is such that the trajectory of the molten lead formed in the arc results in the molten lead falling directly into the mouth 64 of the nozzle 48' with a consequent minimal heat loss and lesser chance of back up.

Figure 6:
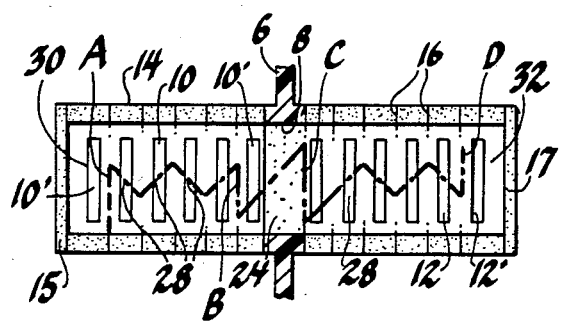
FIG. 6 is a plan view of a portion of an intercell partition and contiguous plate strap forming troughs ready for filling with arc-melted lead according to the present invention.

FIG. 6 is a sectioned, plan view of the battery of FIG. 1 showing a portion of the partition 6, opening 8, thickened saddle 24, and troughs 14 and 16 aligned with the opening 8 and forming an essentially continuous trough for receiving the arc-melted lead in the manner described in conjunction with FIG. 1. The end of the troughs 14 and 16 are closed off by end plates 15 and 17, respectively, to prevent outflow of molten lead therefrom. In operation, the lead dispensing device 22 traverses the full length of this essentially continuous trough so as to form a lead bar (i.e., plate strap 18) which not only joins the several plate lugs together but also forms the intercell connector 19 between adjacent cell compartments of the battery. The lead dispenser 22 will preferably traverse the continuous trough following substantially the zig-zag pattern shown in the dotted line of FIG. 6 and such that the molten lead stream and heated gases exiting the nozzle 48 impinge on the centermost portions 28 of the tops of the lugs 10 and 12 inboard of the ends 30 and 32 of each set thereof. The end lugs 10' and 12' of each set, including those adjacent the opening 8, need not be contacted in the center but rather receive sufficient heat by their prolonged exposure to the lead stream and hot gases resulting from the stream's paralleling thereof at path segments A, B, C and D.

Figure 7:
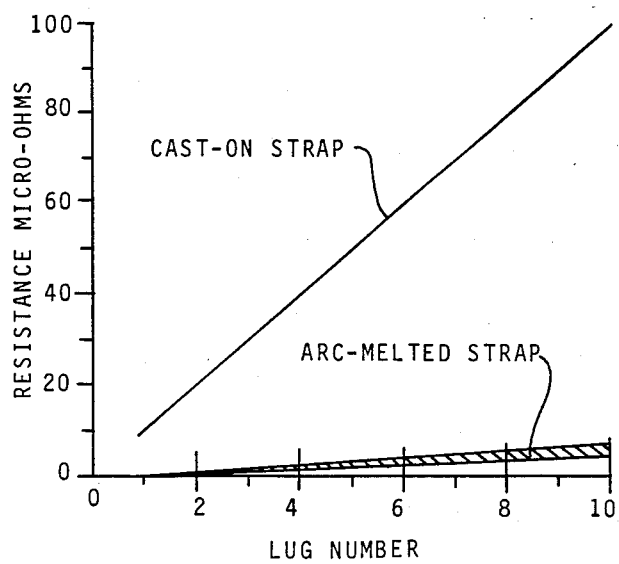
FIG. 7 is a plot of the electrical resistances along the length of plate straps formed according to the present invention compared to plate straps formed by the conventional, inverted lug immersion cast-on-strap process.

FIG. 7 is a plot of the electrical resistances at various locations along plate straps made in accordance with the present invention compared to plate straps made according to assignee's commercial immersed lug cast-on-strap process. In this regard, one probe of an ohmmeter is positioned at one end of the plate strap and the other probe moved from one plate lug to the next along the length of the plate strap. The upper curve shows the high resistances obtained on the conventionally cast plate straps while the lower curve shows the significantly lower resistances obtained on plate straps made in accordance with the present invention.

Figure 8:
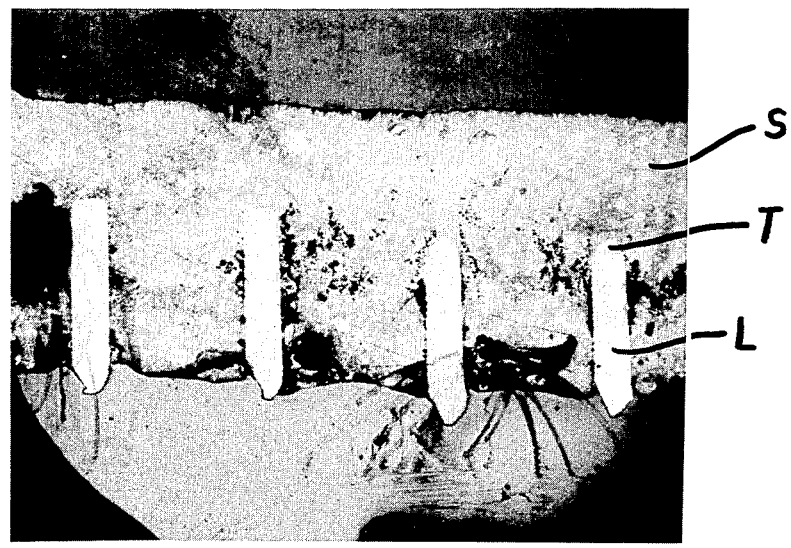
FIG. 8 is a photomicrograph of battery plate strap formed by the conventional, inverted, lug immersion, cast-on-strap technique.
Figure 9:
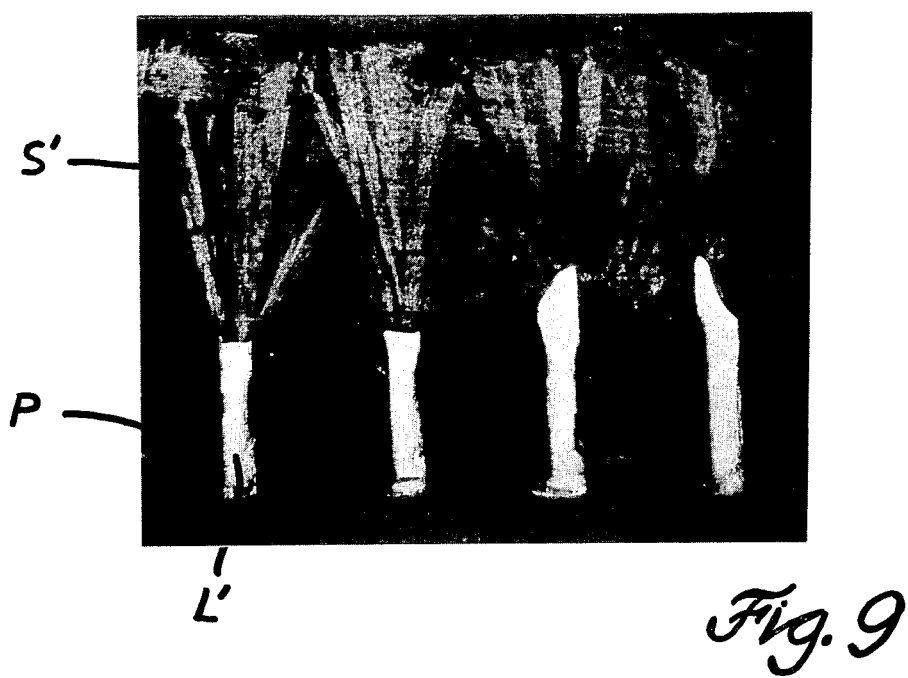
FIG. 9 is a photomicrograph of a battery plate strap formed according to the present invention.

FIG. 8 is a photomicrograph of a plate strap made in accordance with a prior art immersed lug, cast-on-strap process, as such process is presently practiced commercially by the assignee. As can be seen from the photomicrograph, the plate strap material S melds substantially only with the tips T of the lugs L leaving the lower portions thereof substantially intact and unmelted. FIG. 9, on the other hand, is a photomicrograph of a plate strap formed in accordance with the present invention wherein the lugs have been substantially completely amalgamated with the lead forming the strap S'. The only portions L' of the lugs that remain intact are those embedded in the plastic P forming the trough. Electrical tests run on similar sets of plate straps have shown that strap-lug assemblies which are formed according to the present invention (see FIG. 9), and hence have a complete amalgamation of the lugs with the strap material, have a conductivity which is about 15 times greater than that of conventional strap-lug assemblies (see FIG. 8). As a result, it is now possible to maintain a higher terminal voltage under load conditions as well as provide an opportunity for a significant reduction in the amount of lead needed in a plate strap. Moreover, because the process of the present invention is more accurately controllable (i.e., within about 5%), in terms of the amount of lead dispensed to the trough, significant reduction in the amount of excess lead now used is possible.

Figure 10:
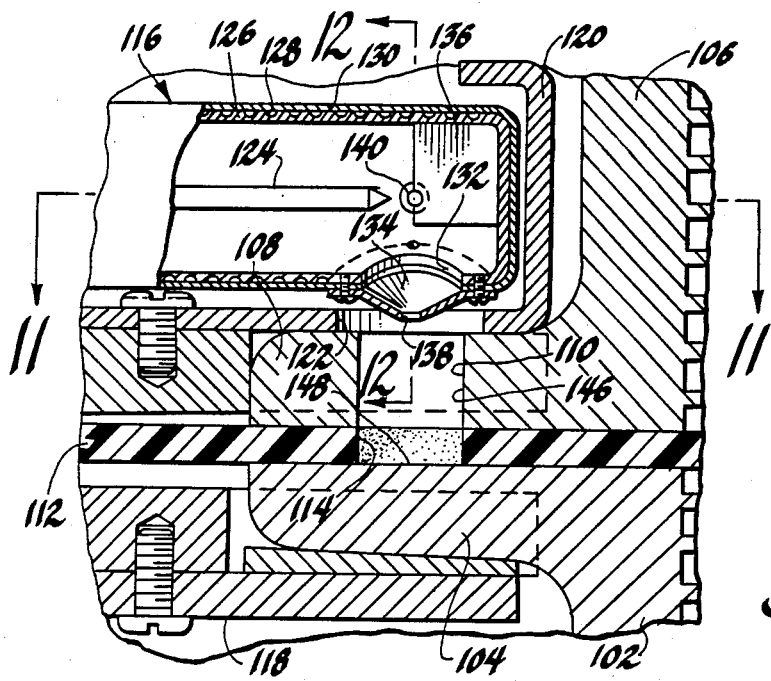
FIG. 10 is a sectional, elevation view of an intercell partition and contiquous plate strap connector ears preparatory to joining according another aspect of the present invention.
Figure 11:
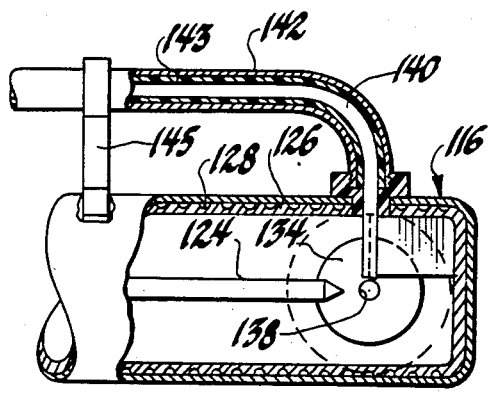
FIG. 11 is a view in the direction 11—11 of FIG. 10.
Figure 12:
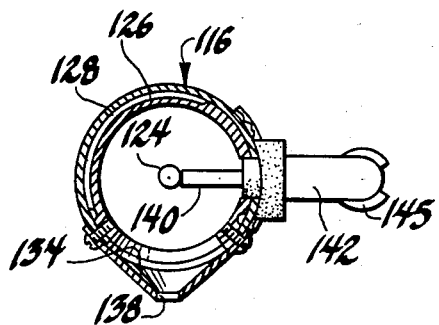
FIG. 12 is a view in the direction 12—12 of FIG. 10.
Figure 13:
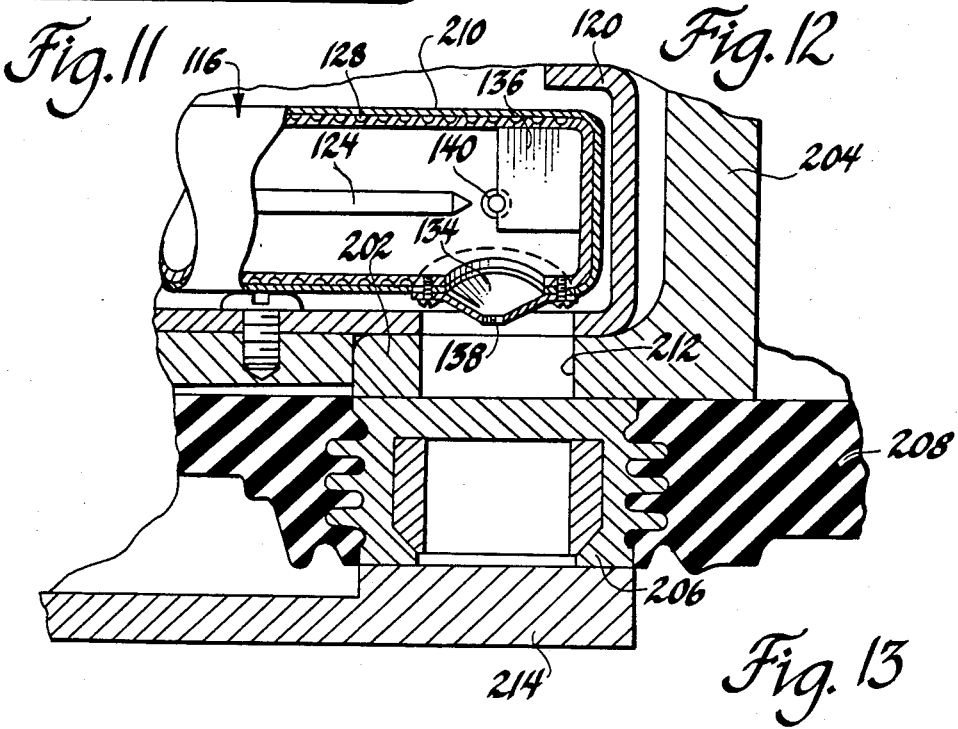
FIG. 13 is a sectioned, elevational view of a battery container sidewall and associated side terminal preparatory to joining a plate strap connector ear to the side terminal according to still another aspect of the present invention.

The arc-melting process of the present invention is also useful for joining lead battery parts other than plate lugs and straps. For example, the arc-melting process may be used to form an intercell connector between upstanding plate strap ears positioned on either side of an intercell partition having an aperture therein (see FIG. 10), or to joining an upstanding plate strap ear to a battery terminal extending through the sidewall of a battery container (see FIG. 13). More specifically, in FIG. 10 a positive polarity plate strap 102 has a flat prefluxed upstanding ear 104 thereon and a negative plate strap 106 has an upstanding prefluxed ear 108 thereon. The ear 108 has an opening 110 therein. The ears 104 and 108 are aligned on opposite sides of an intercell partition 112 having an aperture 114 therethrough and aligned with the aperture 110 in the ear 108. At the connector forming station, the battery is rotated 90° such that the apertured ear 108 is uppermost. An arc-melting lead dispensing device 116 is inserted into the cell compartment associated with the apertured ear 108 and an anvil 118 is inserted into the next adjacent cell compartment for pressing the ear 104 tightly against the partition 112. The lead dispensing device 116 is supported in a rigid clamping member 120 which presses the ear 108 against the partition 112 during the connector casting step. An aperture 122 in the clamping member 120 is aligned with the aperture 110 as shown. A nonconsumable electrode 124 is extends axially into a tubular metal housing 126 having a plurality of cooling channels 128 cut into the outer surface thereof for conducting oil therethrough. A thin metal sheath 130 covers the surface of the housing 126 to enclose the cooling channels 128. An opening 132 in the housing 126 includes a removable/replaceable melt dispensing nozzle 134 for directing melt formed within the housing 126 into the apertures 110 and 114 aligned therewith via the port 138 in the nozzle 134. A copper tungsten counterelectrode block 136 is positioned substantially axially opposite the electrode 124 and substantially in line with the port 138 at the bottom of the nozzle 134. As best shown in FIG. 11, a lead wire 140 is fed into the housing 126 onto the block 136 via a metal tube 142 having a low friction fluorocarbon (e.g., Teflon) lining 143. The tube is held in position relative to the housing 126 via a bracket 145. The lead wire 140 enters the housing 126 via a Vespal grommet 144 in essentially the same manner as described above. An ionizable, substantially non-oxidizing gas is pumped through the housing 126 to support the arc formed between the electrode 124 and counterelectrode 136. In operation, flow of the support gas is begun and an arc struck between the electrode 124 and counterelectrode 136. Gas heated by the arc exits the port 138 into the cavity formed by the opening 110 and aperture 114. The arc-heated gases expel oxygen from the cavity and preheat the ears 104 and 108 preparatory to introducing lead into the cavity. The gas will preferably include some $H_2$ (i.e., up to about 5%) as a reducing atmosphere to assist the flux in eliminating any oxides that might be present on the surfaces of the ears 104 and 108. After preheating the lugs, feeding of the lead wire 140 begins and continues until sufficient superheated, oxide-free lead melt has been deposited into the cavity between the ears 104 and 108. The superheated molten lead melds with the surfaces 146 and 148 of the preheated ears 104 and 108, respectively, and will result in an intercell connection having a very low electrical resistance. The depth of melding can be varied by the amount of preheat applied to the ears before starting the lead flow. After the lugs have cooled sufficiently, the anvil 118 and clamping member 120 are squeezed together to upset the ears and intercell connectors to insure a better seal thereat.

In another application of the arc-melting process, an ear 202 on a plate strap 204 is joined to a terminal 206 in the sidewall 208 of a battery container (see FIG. 13) rotated 90° from the upright position. In this regard, the ear 202 will be joined to the terminal in substantially the same manner as the ears 104 and 108 were joined in the process described in FIG. 10 but without an apertured partition therebetween. Rather the ear 202, having an opening 212, abuts the terminal 206 directly. After an initial preheating as described above, melt is dispensed from the tubular arc-melting device 210 into the opening 212 to form the connections. An anvil 214 backs up the terminal 206 throughout the operation.

While the invention has been disclosed primarily in terms of specific embodiments thereof it is not intended to be limited thereto but rather only to the extent set forth in the claims which follow.

The embodiments of the invention in which an exclusive property or privilege is claimed are defined as follows:

1. A method of joining a set of aligned, upstanding, like-polarity, lead-acid storage battery plate lugs together in a cell element comprising the steps of:
    forming a trough about said aligned lugs for receiving and shaping molten lead therein;
    traversing substantially the length of said trough with a molten lead dispensing means having a substantially non-consumable electrode for generating an electric arc, means for substantially shielding said lugs from the said arc, and means for directing a stream of superheated molten lead formed in said arc into said trough;
    maintaining an electric arc with said electrode which is of sufficient intensity to melt and superheat lead fed into said arc;
    shielding said lugs from said arc;
    supplying an ionizable, non-oxidizing gas to said electrode to support said arc in a substantially non-oxidizing atmosphere;
    progressively feeding a substantially continuous length of solid lead into said arc for melting and superheating therein to provide a substantially uninterrupted supply of molten lead for effecting said joining;

dispensing a stream of said molten lead onto said lugs during said traversing so as to substantially engulf and cause said lugs to meld with said molten lead in said trough, and covering said trough with a blanket of substantially non-oxidizing gas during amalgamation.

2. A method of joining a set of aligned, upstanding, like-polarity, lead-acid storage battery plate lugs together in a cell element comprising the steps of:

forming a trough about said aligned lugs tor receiving and shaping molten lead therein;

traversing substantially the length of said trough with an arc-melting and molten lead dispensing means having a substantially non-consumable electrode for generating an electric arc, means for substantially shielding said lugs from the said arc, and means for directing a stream of substantially oxide-free, superheated molten lead formed in said arc into said trough;

maintaining an electric arc with said electrode which is of sufficient intensity to melt and superheat lead fed into said arc;

shielding said lugs from said arc;

supplying a sufficient quantity of an ionizable, non-oxidizing gas to said electrode to support said arc in a substantially non-oxidizing atmosphere and to blanket said lugs in an atmosphere of said gas heated by said arc;

progressively feeding a substantially continuous length of solid lead into said arc for melting and superheating therein to provide a substantially uninterrupted supply of molten lead for effecting said joining; and dispensing a stream of said molten lead heated gas onto said lugs during said traversing so as to cause said lugs to substantially amalgamate with said molten lead in said trough.

3. A method according to claim 1 wherein said dispensing means traverses said trough in a substantially zig-zag route such that said stream impinges on substantially the center of each said lug inboard the ends of said set.

4. A method according to claim 2 wherein said dispensing means traverses said trough in a substantially zig-zag route such that said stream impinges on substantially the center of each said lug inboard the ends of said set.

5. A method of joining a first set of aligned, upstanding, like-polarity, lead-acid storage battery plate lugs together in a first cell element and to a second set of aligned, upstanding, opposite polarity, lead-acid storage battery plate lugs in a second cell element, said elements being positioned in adjacent cell compartments of a multi-cell container, comprising the steps of:

aligning said first and second sets one with the other;

forming a substantially continuous trough about said aligned sets of lugs and bridging said cell compartments for receiving and shaping molten lead therein;

traversing substantially the length of said trough with an arc-melting and molten lead dispensing means having a substantially non-consumable electrode for generating an electric arc, means for substantially shielding said lugs from the said arc, and means for directing a stream of substantially oxide-free superheated molten lead formed in said arc into said trough;

maintaining an electric arc with said electrode which is of sufficient intensity to melt and superheat lead fed into said arc;

shielding said lugs from said arc;

supplying a sufficient quantity of an ionizable, non-oxidizing gas to said electrode to support said arc in a substantially non-oxidizing atmosphere;

progressively feeding a substantially continuous length of solid lead into said arc for melting and superheating therein to provide a substantially uninterrupted supply of molten lead for effecting said joining;

dispensing a stream of said molten lead onto said lugs during said traversing so as to cause said lugs to substantially amalgamate with said molten lead in said trough, and covering said trough with a blanket of substantially non-oxidizing gas during said amalgamation.

6. A method of joining a first set of aligned, upstanding, like-polarity, lead-acid storage battery plate lugs together in a first cell element and to a second set of aligned, upstanding, opposite polarity, lead-acid storage battery plate lugs in a second cell element, said elements being positioned in adjacent cell compartments of a multi-cell container and separated one from the other by an intercell partition having an opening in one edge thereof adapted eceive an intercell connector electrically connecting said elements together, comprising the steps of:

aligning said first and second sets one with the other and with said opening;

forming a trough about each said set in alignment with said opening so as to provide a substantially continuous lead receiving trough extending across two adjacent cell elements for receiving and shaping molten lead therein;

traversing substantially the length of said continuous trough and through said opening with an arc-melting, molten lead dispensing means having a substantially non-consumable electrode for generating an electric arc, means for substantially shielding said lugs from the said arc, and means for directing a stream of substantially oxide-free, superheated lead melt from said arc into said trough;

maintaining an electric arc with said electrode which is of sufficient intensity to melt and superheat lead fed into said arc;

shielding said lugs from said arc;

supplying a sufficient quantity of an ionizable, non-oxidizing gas to said electrode to support said arc in a substantially non-oxidizing atmosphere;

progressively feeding a substantially continuous length of solid lead into said arc for melting and superheating therein to provide a substantially uninterrupted supply of molten lead for effecting said joining;

dispensing a stream of said molten lead onto said lugs during said traversing so as to cause said lugs to substantially amalgamate with said molten lead in said trough, and covering said trough with a blanket of substantially non-oxidizing gas during said amalgamation.

7. The method according to claim 5 wherein heated quantities of said ionizable, non-oxidizing gas exit said directing means so as to impinge on and heat said lugs and provide said blanket.

8. The method according to claim 6 wherein heated quantities of said ionizable, non-oxidizing gas exit said directing means so as to impinge on and heat said lugs and provide said blanket.

9. A method of assembling a battery comprising the steps of:
assembling a plurality of cell elements by alternately interleaving a plurality of lug-bearing positive and negative polarity plates such that the lugs of like polarity are aligned one with the other in sets along at least one side of the element;
inserting each of said cell elements into a separate compartment of a multi-cell container, said compartments each being separated from an adjacent cell compartment by an intercell partition having an opening in one edge thereof extending between said adjacent cell compartments, said opening having a saddle portion at the bottom thereof adapted to shape intercell-connector-forming lead cast therein, said elements being oriented such as to align a lug set of one polarity in one cell element with said opening and with a lug set of opposite polarity on the next adjacent cell element;
forming a trough about each said lug set for receiving and shaping molten lead therein, the trough for said one polarity lug set being aligned substantially with said saddle portion and with the trough for the opposite polarity lug set on the opposite side of said opening so as to form a substantially continuous lead receiving trough extending across two adjacent cell elements;
traversing substantially the length of said continuous trough and through said opening with an arc-melting and molten lead dispensing means having a substantially non-consumable electrode for generating an electric arc, means for substantially shielding said lugs from the said arc, and means for directing a stream of substantially oxide-free, superheated lead melt from said arc into said trough;
maintaining an electric arc with said electrode which is of sufficient intensity to melt and superheat lead fed into said arc;
shielding said lugs from said arc;
supplying a sufficient quantity of an ionizable, non-oxidizing gas to said electrode to support said arc in a substantially non-oxidizing atmosphere;
progressively feeding a substantially continuous length of solid lead into said arc for melting and superheating therein to provide a substantially uninterrupted supply of molten lead for substantially filling said trough;
dispensing a stream of said molten lead onto said lugs during said traversing, said molten metal having a temperature of at least about 850° F. and of sufficient quantity to fill said saddle portion and cause said lugs to substantially amalgamate with said molten lead in said trough; and
covering said trough with a blanket of substantially non-oxidizing gas.

10. The method according to claim 9 wherein heated quantities of said ionizable, non-oxidizing gas exit said directing means so as to impinge on and heat said lugs and provide said blanket.

11. A method according to claim 9 wherein said stream traverses said trough in a substantially zig-zag route so as to impinge on substantially the centermost portions of each of the inboard lugs of said set.

12. A method according to claim 9 wherein said saddle portion comprises a thickened, shelf-like portion of the partition underlying the opening and serves as a heat sink to mitigate the deleterious affects of the molten lead on the saddle.

13. A method according to claim 9 wherein substantially the same material as forms said partition is injection molded into said opening above the metal therein to reconstitute said partition thereat.

14. The method according to claim 9 wherein said lugs comprise an alloy of lead and calcium, said melt comprises an alloy of lead and antimony and said temperature is at least about 950° F.

15. A method of joining a set of aligned, upstanding, like-polarity, lead-acid storage battery plate lugs together in a cell element comprising the steps of:
forming a trough about said aligned lugs for receiving and shaping molten lead therein;
traversing substantially the length of said trough with an arc-melting and molten lead dispensing means having a substantially non-consumable electrode for generating an electric arc and a housing defining a melting chamber surrounding said electrode, so as to shield said arc from the ambient atmosphere and said lugs, said housing including a nozzle for directing a stream of superheated molten lead into said trough;
maintaining an electric arc with said electrode within said chamber, said arc being of sufficient intensity to melt and superheat lead fed into said arc;
supplying a sufficient quantity of an ionizable, non-oxidizing gas to said melting chamber to support said arc in a substantially non-oxidizing atmosphere, exit said nozzle in a heated condition and blanket said lugs in an atmosphere of said heated gas;
progressively feeding a substantially continuous length of said lead into said arc for melting and superheating therein to provide a substantially uninterrupted supply of substantially oxide-free molten lead for effecting said joining; and
dispensing a stream of said molten lead and heated gas from said nozzle onto said lugs during said traversing so as to cause said lugs to substantially amalgamate with said molten lead in said trough.

16. A method according to claim 15 wherein said arc is struck between said electrode and a copper-tungsten alloy block adjacent said nozzle.

17. A method of joining adjacent lead battery parts together via a low resistance electrical coupling therebetween comprising the steps of:
providing a cavity between said parts for receiving and shaping molten lead for forming said coupling;
positioning a molten lead dispensing means over said cavity, said dispensing means having a substantially non-consumable electrode for generating an electric arc, means for substantially shielding said parts from said arc, and means for directing a stream of substantially oxide-free, superheated molten lead formed in said arc into said cavity;
maintaining an electric arc with said electrode which is of sufficient intensity to melt and superheat lead fed into said arc;
shielding said parts from said arc;
supplying sufficient ionizable, non-oxidizing gas to said electrode to support said arc in a substantially non-oxidizing atmosphere and to blanket said cavity in an atmosphere of arc-heated gas upon exiting said directing means;

progressively feeding a substantially continuous length of solid lead into said arc for melting and superheating therein; and dispensing a stream of said molten lead into said cavity so as to meld with the surfaces of said parts contacted by said molten lead and form said coupling.

18. A method of joining adjacent lead battery parts together via a low resistance electrical coupling therebetween comprising the steps of:

providing a cavity between said parts for receiving and shaping molten lead for forming said coupling;

positioning a molten lead dispensing means over said cavity, said dispensing means having a substantially non-consumable electrode for generating an electric arc, means for substantially shielding said parts from said arc, and means for directing a stream of substantially oxide-free, superheated molten lead formed in said arc into said cavity;

maintaining an electric arc with said electrode which is of sufficient intensity to melt and superheat lead fed into said arc;

shielding said parts from said arc;

supplying sufficient ionizable, non-oxidizing gas to said electrode to support said arc in a substantially non-oxidizing atmosphere and to blanket said cavity in an atmosphere of arc-heated gas upon exiting said directing means, said arc-heated gas serving to preheat said parts prior to dispensing said molten lead to said cavity;

thereafter progressively feeding a substantially continuous length of solid lead into said arc for melting and superheating therein; and dispensing a stream of said molten lead into said cavity so as to meld with the surfaces said parts contacted by said molten lead.

19. A method of forming a low resistance intercell connector between cell elements in adjacent cell compartments of a multi-cell battery container, said elements each having an upstanding ear for joining to said connector, and said compartments being separated one from the other by an intercell partition having an aperture therein for receiving said connector, said method comprising the steps of:

forming an opening through one of said ears;

positioning said elements in said compartments such that said ears lie on opposite sides of said partition with said opening in substantial alignment with said aperture;

orienting said container such that said one ear overlies said partition and other ear;

positioning a molten lead dispensing means over said opening, said dispensing means having a substantially non-consumable electrode for generating an electric arc, means for substantially shielding said ears from said arc, and means for directing a stream of substantially oxide-free, superheated molten lead formed in said arc into said aperture and opening;

maintaining an electric arc with said electrode which is of sufficient intensity to melt and superheat lead fed into said arc;

shielding said ears from said arc;

supplying an ionizable, non-oxidizing gas to said electrode to support said arc in a substantially non-oxidizing atmosphere and to blanket said opening and aperture in an atmosphere of arc-heated said gas upon exiting said direction means;

progressively feeding a substantially continuous length of solid lead into said arc for melting and superheating therein; and dispensing a stream of said molten lead into said aperture and opening for substantially filling said aperture and opening and melding with the surfaces of said ears.

20. A method of forming a low resistance intercell connector between cell elements in adjacent cell compartments of a multi-cell battery container, said elements each having an upstanding ear for joining to said connector, and said compartments being separated one from the other by an intercell partition having an aperture therein for receiving said connector, said method comprising the steps of:

forming an opening through one of said ears;

positioning said elements in said compartments such that said ears lie on opposite sides of said partition with said opening in substantial alignment with said aperture;

orienting said container such that said one ear overlies said partition and other ear;

positioning a molten lead dispensing means over said opening, said dispensing means having a substantially non-consumable electrode for generating an electric arc, means for substantially shielding said ears from said arc, and means for directing a stream of substantially oxide-free, superheated molten lead formed in said arc into said aperture and opening;

maintaining an electric arc with said electrode which is of sufficient intensity to melt and superheat lead fed into said arc;

shielding said ears from said arc;

supplying an ionizable, non-oxidizing gas to said electrode to support said arc in a substantially non-oxidizing atmosphere and to blanket said opening and said cavity in an atmosphere of arc-heated said gas upon exiting said directing means, said arc-heated gas serving to preheat said ears prior to dispensing said molten lead to said aperture and opening;

thereafter progressively feeding a substantially continuous length of solid lead into said arc for melting and superheating therein; and dispensing a stream of said molten lead into said aperture and opening for substantially filling said aperture and opening and melding with the surfaces of said ears.

21. A method of joining a battery terminal to a cell element having an upstanding ear thereon comprising the steps of:

forming an opening through said ear;

positioning said element in a container having said terminal extending through a side wall thereof, said terminal having a face inside said container abutting said ear;

orienting said container such that said ear overlies said face;

positioning a molten lead dispensing means over said opening, said dispensing means having a substantially non-consumable electrode for generating an electric arc, means for substantially shielding said ear and face from said arc, and means for directing a stream of substantially oxide-free, superheated molten lead formed in said arc into said opening;

maintaining an electric arc with said electrode which is of sufficient intensity to melt and superheat lead fed into said arc;

shielding said ear and face from said arc;

supplying an ionizable, non-oxidizing gas to said electrode to support said arc in a substantially non-oxidizing atmosphere and to blanket said opening and said face in an atmosphere of arc-heated said gas upon exiting said directing means, said arc-heated gas serving to preheat said ear and terminal prior to dispensing said molten lead to said opening;

thereafter progressively feeding a substantially continuous length of solid lead into said arc for melting and superheating therein; and dispensing a stream of said molten lead into said opening for substantially filling said opening and melding with said ear and terminal surface.

22. Apparatus for casting molten lead into a trough surrounding a plurality of like-polarity battery plate lugs for forming a low electrical resistance coupling with said lugs comprising:

means for dispensing a substantially continuous stream of substantially oxide-free superheated molten lead into said trough, said dispensing means comprising, a substantially non-consumable electrode for generating an electric arc, a counterelectrode proximate said electrode, a housing surrounding said electrode and counterelectrode, said housing defining a melting chamber for generating said molten lead in a substantially oxygen-free atmosphere, means for maintaining the temperature of said housing within a predetermined temperature range, a nozzle operatively associated with said housing for directing said molten lead into said trough and shielding said lugs from said arc, means for feeding a substantially continuous length of lead wire into said arc for melting and superheating therein, means for pressurizing said melting chamber with an ionizable, non-oxidizing gas for supporting said arc; and means for supporting said dispensing means above said trough and for traversing said dispensing means the length of said trough along a predetermined path.

23. Apparatus according to claim 22 wherein said counterelectrode comprises an erosion-resistant, copper-tungsten alloy #E10W.

24. Apparatus according to claim 22 wherein said nozzle is offset from the site of said arc in the direction said wire is fed into said housing and such as to lie substantially on the trajectory melt formed in said arc takes as it leaves said arc.

* * * * *